(12) United States Patent
Lee

(10) Patent No.: US 6,877,164 B2
(45) Date of Patent: Apr. 5, 2005

(54) TURNTABLE APPARATUS FOR DISK DRIVE

(75) Inventor: Dong-Woo Lee, Suwon (KR)

(73) Assignee: LG Electronics, Inc., Seoul (KR)

( * ) Notice: Subject to any disclaimer, the term of this patent is extended or adjusted under 35 U.S.C. 154(b) by 292 days.

(21) Appl. No.: 10/125,490

(22) Filed: Apr. 19, 2002

(65) Prior Publication Data

US 2002/0154594 A1 Oct. 24, 2002

(30) Foreign Application Priority Data

Apr. 19, 2001 (KR) ........................................ 2001-21213

(51) Int. Cl.[7] .......................... G11B 17/028; G11B 23/00
(52) U.S. Cl. ..................................... 720/695; 369/263.1
(58) Field of Search ............................... 720/695, 700; 369/263.1, 247.1, 270.1, 264, 263, 247, 270; 360/133

(56) References Cited

U.S. PATENT DOCUMENTS

| | | | | |
|---|---|---|---|---|
| 4,796,140 A | * | 1/1989 | Wakabayashi et al. | 360/133 |
| 5,241,530 A | * | 8/1993 | Kobayashi et al. | 369/264 |
| 5,758,408 A | * | 6/1998 | Choi | 29/732 |
| 5,761,794 A | * | 6/1998 | Choi | 29/732 |
| 5,825,746 A | * | 10/1998 | Lee | 369/270 |
| 5,995,480 A | * | 11/1999 | Naka et al. | 369/263 |
| 6,249,504 B1 | * | 6/2001 | Iwanaga | 369/247 |
| 6,330,220 B1 | * | 12/2001 | Shiga et al. | 369/263 |

* cited by examiner

Primary Examiner—Allen Cao
(74) Attorney, Agent, or Firm—Harness, Dickey & Pierce, P.L.C.

(57) ABSTRACT

A turntable apparatus for a disk drive comprises: a rotational shaft of a driving source; a turntable inserted into the rotational shaft so as to be trembled a certain degree toward front and rear, right and left directions; a pivot joint fixed on the rotational shaft from a lower part of the turntable for transmitting a rotational force to the turntable; a guide cap coupled to the rotational shaft from an upper part of the turntable for guiding a disk to be mounted on the turntable; and an elastic member installed between the turntable and the guide cap for providing an expansion elastic force, and thereby, operational reliability of the disk drive can be improved greatly and fabrication cost can be reduced because components producing and assembling operation can be performed easily.

19 Claims, 3 Drawing Sheets

TURNTABLE APPARATUS FOR DISK DRIVE

BACKGROUND OF THE INVENTION

1. Field of the Invention

The present invention relates to a disk drive, and particularly, to a turntable apparatus, on which a disk is mounted so that the disk can be rotated, for a disk drive.

2. Description of the Background Art

FIG. 1 is a plan view showing a pick-up base of a disk drive according to the conventional art.

As shown therein, an optical pick-up 3 is installed on a pick-up base 1 so as to be rotatable. The pick-up base 1 is installed so that a front end part of the pick-up base 1 can be elevated as a predetermined angle centering around a rear end part on a main base (not shown).

The optical pick-up 3 radiates light on a signal recording surface of the disk and detects reflected light, and functions as recording a signal on the signal recording surface of the disk or reproducing the recorded signal. The optical pickup 3 performs linear reciprocating movements as guided by pick-up guide shafts 4 and 4' on the pick-up base 1.

On the other hand, a driving force for moving the optical pick-up 3 is provided by a sled motor (not shown) generally, and the driving force of the sled motor is transmitted to the optical pick-up via a lead screw (not shown).

On the other hand, a spindle motor 7 for providing a driving force to rotate the disk is installed on a front end of the pick-up base 1. In addition, a circuit board 8, on which a structure for controlling the operation is disposed, is mounted on a lower part of the spindle motor 7.

In addition, a plurality of fixing shafts 9 are caulked on the pick-up base 1. Herein, a spring (not shown) is inserted on an outer surface of the fixing shaft 9, and the spring is installed between a bottom surface of the pick-up base 1 and an upper surface of the circuit board 8 to provide the circuit board 8 with an elastic force toward the direction far from the pick-up base 1.

Also, a skew screw (not shown) is installed on the fixing shaft 9 as penetrating the circuit board 8, and the skew screw fixes the circuit board 8 on the pick-up base 1, and at the same time, controls a distance between the upper surface of the circuit board 8 and the bottom surface of the pick-up base 1. Actually, the skew screw controls the height of the spindle motor 7 to make the light radiated from the optical pick-up 3 incident and collected vertically to the signal recording surface of the disk. On the other hand, the controlling operation of the skew screw is called as skew controlling.

Especially, a turntable 10 on which the disk is mounted is installed on an upper end of the spindle motor 7. The turntable 10 rotates the disk as rotated by the spindle motor in the state that the disk is mounted on the turntable.

FIG. 2 is showing a detailed structure of the turntable 10. The turntable 10 is press-fitted into a rotational shaft 7' of the spindle motor 7. In addition, a friction member 12 is installed on a boundary of an upper outer circumferential surface on the turntable 10 to prevent the disk which is mounted on the turntable 10 from being rotated relatively when the turntable 10 rotates.

In addition, a guide cap 14 is installed on an upper part of the turntable 10. The guide cap 14 is installed on the rotational shaft 7', and a spring 15 is installed between the turntable 10 and the guide cap 15. The spring provides the guide cap 14 with the elastic force so that a central hole of the disk can be mounted on the guide cap 14 exactly.

Therefore, a slant portion 14a for guiding the central hole of the disk is disposed on boundary of outer circumferential surface of the guide cap 14. A stopper 16 is installed on an upper end of the guide cap 14 to prevent the guide cap 14 from being drifted away from the rotational shaft 7'.

However, there are some problems in above conventional art as follows.

The turntable 10 is installed as being press-fitted into the rotational shaft 7'. Therefore, the rotational shaft 7' and the turntable 10 rotate integrally with each other without a relative motion. However, if the surface of the turntable 10 does not make a right angle for the rotational shaft 7', the turntable 10 is greatly shaken when the turntable 10 is rotated.

As described above, when the turntable 10 is trembled excessively, the disk is also trembled, and therefore, the operations of recording or reproducing the signal on the disk via the optical pick-up. Accordingly, the reliability of the disk drive is greatly lowered.

SUMMARY OF THE INVENTION

Therefore, an object of the present invention is to provide a turntable apparatus for a disk drive by which a turntable can be assembled easily by constructing the turntable to be coupled to a rotational shaft as a pivot structure and to be rotated as making a right angle with the rotational shaft without trembling when the turntable is rotated more than a predetermined speed, and a reliability of the disk drive can be improved by making recording and reproducing operations of a signal exact.

To achieve the object of the present invention, as embodied and broadly described herein, there is provided a turntable apparatus of a disk drive according to the present invention comprising: a rotational shaft of a driving source; and a turntable coupled to the rotational shaft so as to be trembled a certain degree toward front and rear, or right and left directions and rotated vertically with the rotational shaft when the turntable is rotated more than a predetermined speed.

A pivot joint is disposed between the rotational shaft and the turntable for transmitting the rotating force of the rotational shaft to the turntable.

The pivot joint is coupled to the rotational shaft and rotates integrally with the rotational shaft, and has a coupling portion which is coupled to the turntable.

The pivot joint is formed as a round plate, and a supporting surface having a relatively smaller outer diameter for supporting the turntable is formed on an upper part of the pivot joint.

The turntable includes a hole, through which the rotational shaft is passed, on a center part, and an inner diameter of the hole is formed to be larger than the outer diameter of the rotational shaft.

The hole includes a coupling portion which is coupled to the pivot joint.

The coupling portion means a recess as connected to the hole.

The pivot joint includes a protrusion which is coupled to the turntable, and the turntable includes a recess in which the protrusion is inserted to be coupled.

The protrusion is coupled to the recess so that the turntable can be trembled a certain degree toward the front and rear, right and left directions.

Two pairs of protrusion and recess are disposed and coupled with each other.

The pivot joint is made as a round plate, includes a hole on a center part so as to be press-fitted into the rotational shaft and fixed, and includes a coupling portion which is coupled to the turntable on an upper surface.

A guide cap for guiding the disk so as to be mounted on the turntable exactly is located on an upper part of the turntable.

An elastic member for providing elastic force toward both guide cap and turntable directions is disposed between the guide cap and the turntable.

A stopper for preventing the guide cap from being drifted away from the rotational shaft is installed on an upper part of the guide cap.

Also, there is provided a turntable apparatus of a disk drive according to the present invention comprising: a rotational shaft of a driving source; a turntable which is inserted into the rotational shaft so as to be trembled a certain degree toward front and rear, right and left directions; a pivot joint fixed on the rotational shaft from a lower part of the turntable for transmitting a rotational force to the turntable; a guide cap coupled to the rotational shaft from an upper part of the turntable for guiding a disk to be mounted on the turntable; and an elastic member installed between the turntable and the guide cap for providing an expansion elastic force.

The turntable includes a hole, through which the rotational shaft is passed, on a center part, and an inner diameter of the hole is formed to be larger than an outer diameter of the rotational shaft.

The pivot joint is made as a round plate, includes a hole on a center part so as to be press-fitted into the rotational shaft and fixed, and includes a protrusion which is protruded to be coupled to the turntable on an upper surface of the pivot joint.

The pivot joint includes a protrusion coupled to the turntable, and the turntable includes a recess in which the protrusion is inserted and coupled.

The protrusion is coupled to the recess so that the turntable can be trembled toward front and rear, right and left directions.

A stopper for preventing the guide cap from being drifted away from the rotational shaft is installed on an upper part of the guide cap.

The turntable apparatus for the disk drive according to the present invention is constructed so as to be operated as making a right angle in actual operation even the degree of angle between the turntable and the rotational shaft of a spindle motor is not managed, and thereby the operational reliability of the disk drive can be greatly improved. In addition, components producing and assembling operation can be performed easily, and thereby the production cost can be lowered.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments of a turntable apparatus for a disk drive according to the present invention, and the most preferred embodiment will be described hereinafter.

Figure 1:
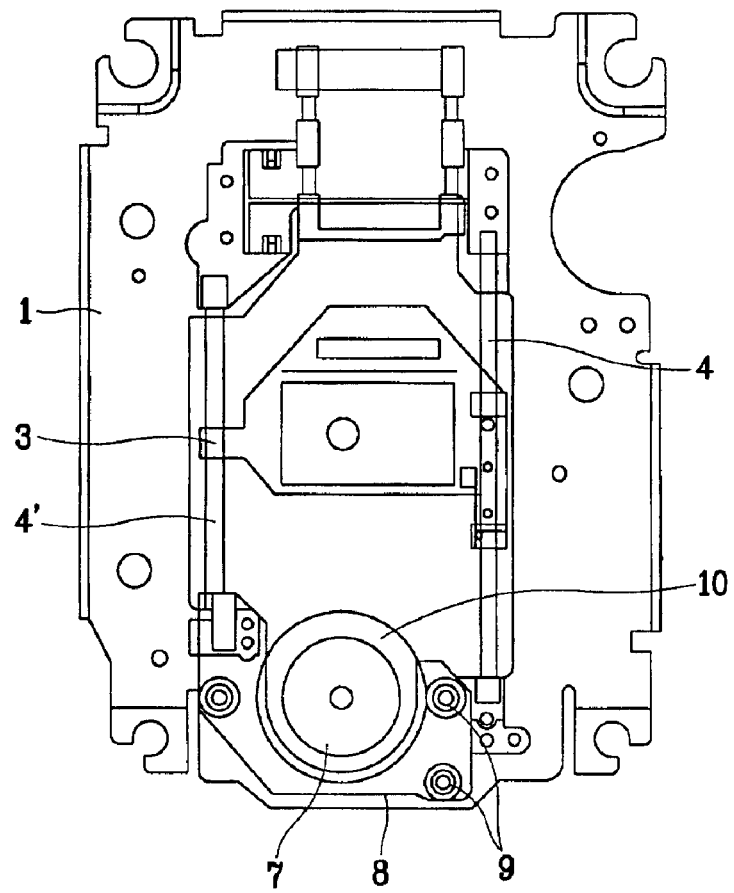
FIG. 1 is a plan view showing a pick-up base of a disk drive according to the conventional art.
Figure 2:
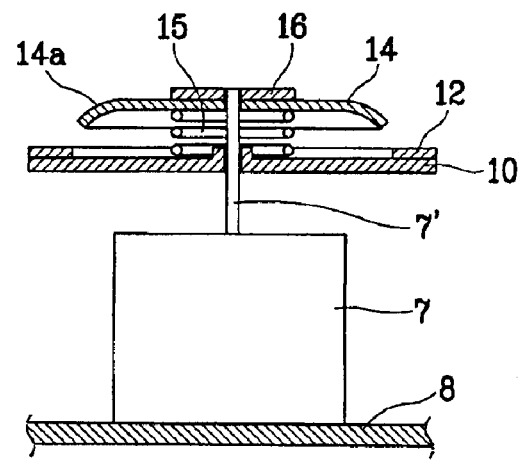
FIG. 2 is a cross-sectional view showing a turntable apparatus of the disk drive according to the conventional art.
Figure 3:
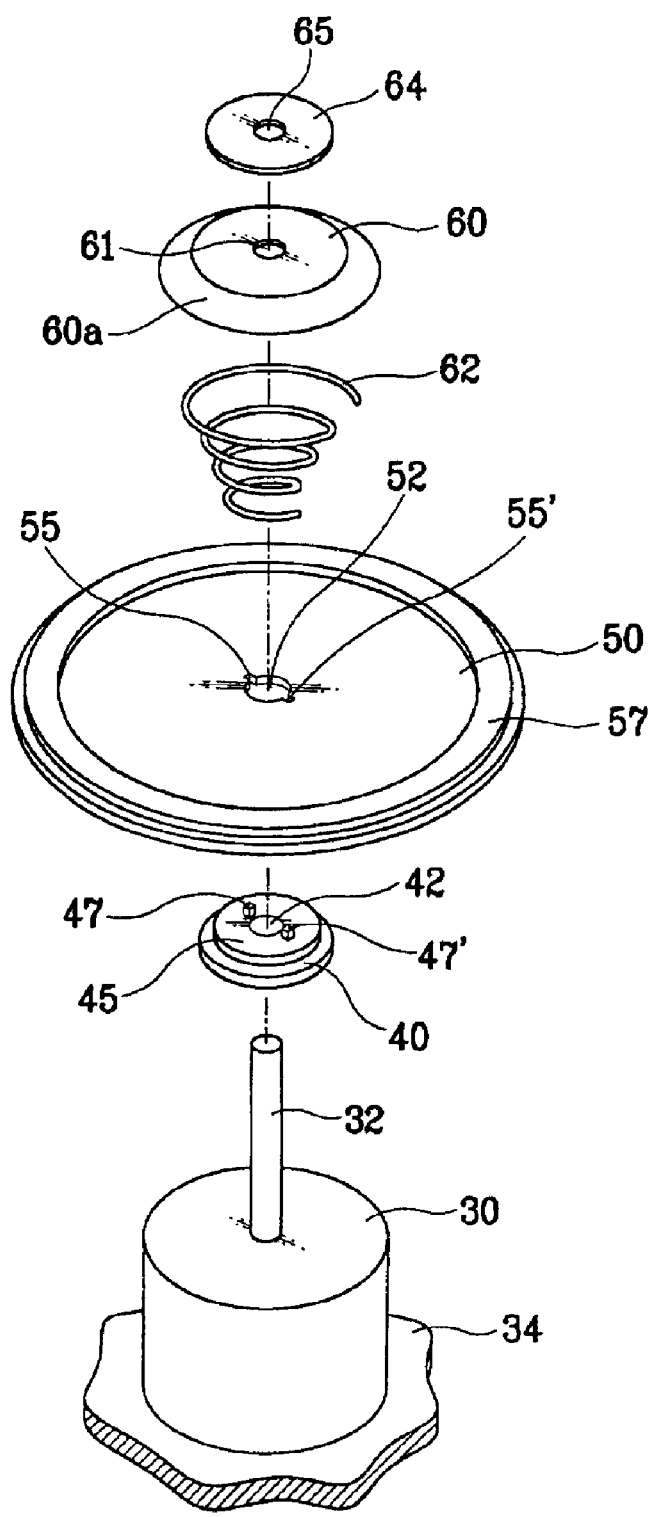
FIG. 3 is an exploded perspective view showing a turntable apparatus of a disk drive according to the present invention.
Figure 4:
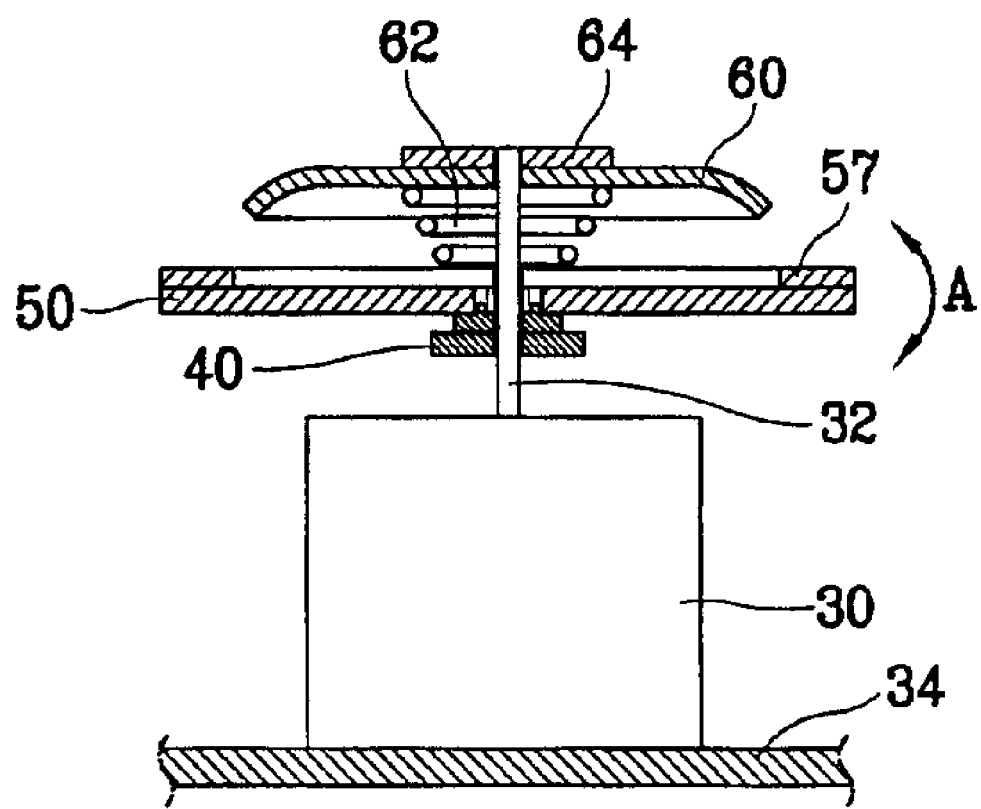
FIG. 4 is a cross-sectional view showing the turntable apparatus of the disk drive according to the present invention.

FIG. 3 is an exploded perspective view showing a turntable apparatus of a disk drive according to the present invention, and FIG. 4 is a cross-sectional view showing the turntable apparatus of the disk drive according to the present invention.

As shown in FIGS. 3 and 4, a spindle motor 30 is for providing a disk with a rotational driving force, and is fixed on a pick-up base (not shown) by a circuit board 34 located on a lower part of the spindle motor 30. The driving force of the spindle motor 30 is transmitted to a turntable 50 through a rotational shaft 32.

A pivot joint 40 is coupled to the rotational shaft 32. The pivot joint 40 includes a hole 42 penetrating the pivot joint 40, and the pivot joint 40 is fixed on the rotational shaft as press-fitted into the rotational shaft.

A supporting surface 45 by which the turntable is supported is formed on an upper surface of the pivot joint 40 so as to be protruded as a predetermined height. An outer diameter of the supporting surface 45 is formed to be smaller than the entire outer diameter, and protrusions 47 and 47' coupled to the turntable 50 are formed on an upper surface of supporting surface 45. It is desirable that the protrusions 47 and 47' are disposed on both sides of the hole 42 centering around the hole 42 symmetrically.

In addition, the turntable 50 is inserted into the rotational shaft 32 to be coupled thereto. The turntable includes a hole 52 which is inserted into the rotational shaft 32 on a center part, and recesses 55 and 55' to which the protrusions 47 and 47' of the pivot joint 40 are coupled are formed on both sides of the hole 52.

That is, the turntable 50 is located on the supporting surface 45 of the pivot joint 40 and coupled to the pivot joint 40.

Herein, sizes of the hole 52 and the recesses 55 and 55' on the turntable 50, and sizes of the protrusions 47 and 47' of the pivot joint 40 are decided to be fitted loosely to the rotational shaft 32 or to the protrusions 47 and 47'. That is, the sizes of the hole 52 and the recesses 55 and 55' are decided to be larger than the outer diameter of the rotational shaft 32 and than the sizes of the protrusions 47 and 47' so that the turntable 50 can be trembled toward front and rear, right and left directions.

In addition, a friction member 57 is installed on a boundary of an upper surface of the turntable 50. The friction member 57 is for rotating the disk which is mounted on the turntable 50 integrally with the turntable 50.

On the other hand, a guide cap 60 for guiding the disk to be mounted on the turntable 50 is installed on the upper surface of the turntable 50. A hole 61 is formed on a center part of the guide cap 60 to be inserted into the rotational shaft 32.

The guide cap 60 guides the central hole of the disk which is mounted on the turntable 50, and a slant portion 60a is formed on a boundary part of the guide cap 60 for guiding the disk.

In addition, a stopper 64 for preventing the guide cap 60 from being drifted away from the rotational shaft 32 is installed on an upper end part of the rotational shaft 32. A hole 65 of the stopper 64 is press-fitted into the rotational shaft 32 and fixed, and thereby the upward movement of the guide cap 60 along with the rotational shaft 43 is prevented.

A spring 62 is located between the turntable 50 and the guide cap 60. The spring of a coil spring form is installed on a boundary of the rotational shaft 32 to provide the guide cap 60 and the turntable 50 with an elastic force.

Operation and effect of the turntable apparatus for the disk drive according to the present invention will be described as follows.

The mounting operation of disk on the turntable 50 will be described. When the central hole of the disk is located on the upper part of the guide cap 60, the central hole of the disk is guided by the slant portion 60a of the guide cap 60, and thereby the disk is mounted on the upper surface of the turntable 50 exactly.

At that time, the disk is contacted to the friction member 57 of the turntable 50, and thereby the disk and the turntable 50 can rotate integrally with each other. In addition, the turntable 50 is coupled to the pivot joint 40 loosely, and therefore, the turntable can be moved toward the directions of A in FIG. 4 as a certain degree.

In above status, when the operation of the disk drive is started, the spindle motor 30 is operated to rotate the rotational shaft 32. The pivot joint 40 is rotated by the rotation of the rotational shaft 32, and the turntable 50 which is coupled to the pivot joint 40 is also rotated at the same time.

That is, the recesses 55 and 55' of the turntable 50 are coupled to the protrusions 47 and 47' of the pivot joint 40, and therefore, the turntable 50 is able to rotate with the pivot joint 40 and the rotational shaft 32 at the same time.

At that time, the turntable 50 is trembled toward the front and rear, right and left directions, that is, toward the A direction in FIG. 4, however, when the turntable 50 rotates faster than a predetermined speed, the centrifugal force applied to the turntable becomes larger than the gravity applied to the turntable 50, and thereby the turntable 50 is able to rotate without trembling. That is, the turntable rotates by a principle that a top is able to rotate stably when it is spun at high speed.

Therefore, the turntable 50 rotates at high speed with the rotational shaft 32 as making a right angle for the rotational shaft 32. At that time, the disk which is mounted on the turntable 50 is also rotated as making the right angle for the rotational shaft with the turntable 50.

As described above, when the turntable 50 and the disk rotates as maintaining the right angle for the rotational shaft 32, the operations of recording information on the disk and reproducing the information recorded on the disk can be made exactly.

According to the turntable apparatus for the disk drive of the present invention, the turntable is able to rotate in actual operation even the degree of right angle between the turntable and the rotational shaft of the spindle motor is not managed, and therefore, the operational reliability of the disk drive can be greatly improved, and the fabrication cost can be lowered due to the simple producing operation of components and the assembling processes.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A turntable apparatus for a disk drive comprising:
   a rotational shaft of a driving source;
   a turntable coupled to the rotational shaft to be trembled as a certain degree toward front and rear, or right and left directions to rotate as making a right angle for the rotational shaft when the turntable is rotated faster than a predetermined speed; and
   a pivot joint disposed between the rotational shaft and the turntable, for transmitting a rotational force of the rotational shaft to the turntable.

2. The apparatus of claim 1, wherein the pivot joint is fixed to the rotational shaft to be rotated integrally with the rotational shaft, and includes a coupling portion which is coupled to the turntable on one side surface.

3. The apparatus of claim 2, wherein the pivot joint is formed as a round plate, and includes a supporting surface having a relatively small outer diameter for supporting the turntable formed on an upper part of the pivot joint.

4. The apparatus of claim 1, wherein the turntable includes a hole through which the rotational shaft passes on a center part, and an inner diameter of the hole is formed to be larger than an outer diameter of the rotational shaft.

5. The apparatus of claim 4, wherein the hole includes a coupling portion which is coupled to the pivot joint.

6. The apparatus of claim 5, wherein the coupling portion is a recess formed as connecting to the hole.

7. The apparatus of claim 1, wherein the pivot joint includes a protrusion coupled to the turntable, and the turntable includes a recess in which the protrusion is inserted and coupled.

8. The apparatus of claim 7, wherein the protrusion is coupled to the recess so that the turntable can be trembled toward front and rear, right and left directions as a certain degree.

9. The apparatus of claim 7, wherein two pairs of protrusions and recesses are coupled to each other.

10. The apparatus of claim 1, wherein the pivot joint is formed as a round plate, includes a hole on a center part so as to be press-fitted and fixed into the rotational shaft, and includes a coupling portion which is coupled to the turntable on an upper surface.

11. The apparatus claim 1, further comprising: a guide cap located on an upper part of the turntable, for guiding a disk to be mounted on the turntable exactly.

12. The apparatus of claim 11, further comprising: an elastic member disposed between the guide cap and the turntable to provide both directions with elastic force.

13. The apparatus of claim 11, further comprising: a stopper installed on an upper part of the guide cap, for preventing the guide cap from being drifted away from the rotational shaft.

14. A turntable apparatus for a disk drive comprising:

a rotational shaft of a driving source;

a turntable inserted into the rotational shaft so as to be trembled a certain degree toward front and rear, right and left directions;

a pivot joint fixed on the rotational shaft from a lower part of the turntable for transmitting a rotational force to the turntable;

a guide cap coupled to the rotational shaft from an upper part of the turntable for guiding a disk to be mounted on the turntable; and an elastic member installed between the turntable and the guide cap for providing an expansion elastic force.

15. The apparatus of claim 14, wherein the turntable includes a hole through which the rotational shaft passes on a center part, and an inner diameter of the hole is formed larger than an outer diameter of the rotational shaft.

16. The apparatus of claim 14, wherein the pivot joint is formed as a round plate, includes a hole on a center part so as to be press-fitted and fixed into the rotational shaft, and includes a protrusion which is protruded so as to be coupled to the turntable on an upper surface.

17. The apparatus of claim 14, wherein the pivot joint includes a protrusion which is coupled to the turntable, and the turntable includes a recess in which the protrusion is inserted and coupled.

18. The apparatus of claim 17, wherein the protrusion is coupled to the recess so that the turntable can be trembled toward front and rear, right and left directions.

19. The apparatus of claim 14, wherein a stopper for preventing the guide cap from being drifted away from the rotational shaft is installed on an upper part of the guide cap.

* * * * *